(12) United States Patent
Winter

(10) Patent No.: US 9,986,823 B2
(45) Date of Patent: Jun. 5, 2018

(54) PORTABLE CONTAINER SYSTEM

(71) Applicant: WRASP LTD, Harlow (GB)

(72) Inventor: Ian Winter, Wrexham (GB)

(73) Assignee: WEIGHT REDUCTION AND AEROSPACE SECURITY PRODUCTS LIMITED, London (GB)

( * ) Notice: Subject to any disclaimer, the term of this patent is extended or adjusted under 35 U.S.C. 154(b) by 0 days. days.

(21) Appl. No.: 15/034,457

(22) PCT Filed: Nov. 4, 2014

(86) PCT No.: PCT/EP2014/073715
§ 371 (c)(1),
(2) Date: May 4, 2016

(87) PCT Pub. No.: WO2015/063332
PCT Pub. Date: May 7, 2015

(65) Prior Publication Data
US 2016/0270527 A1    Sep. 22, 2016

(30) Foreign Application Priority Data
Nov. 4, 2013 (GB) .................... 1319448.5

(51) Int. Cl.
*A47B 31/06* (2006.01)
*A47B 31/02* (2006.01)
(Continued)

(52) U.S. Cl.
CPC .............. *A47B 31/06* (2013.01); *A47B 31/02* (2013.01); *A47B 47/0091* (2013.01);
(Continued)

(58) Field of Classification Search
CPC .............. A47B 31/06; A47B 2031/002; B64D 11/0007; B62B 2202/67; B62B 3/002; B62B 3/004
See application file for complete search history.

(56) References Cited

U.S. PATENT DOCUMENTS 4,098,424 A * 7/1978 Liebscher .............. B65D 88/14
                                                    220/1.5
4,915,913 A * 4/1990 Williams .................. A61L 2/26
                                                    220/324
(Continued)

FOREIGN PATENT DOCUMENTS

EP          512256       11/1992
EP       0 700 820 A2    3/1996
(Continued)

OTHER PUBLICATIONS

International Search Report for International Application No. PCT/EP2014/073715 dated Jan. 8, 2015.
(Continued)

Primary Examiner — Brian L Swenson
(74) Attorney, Agent, or Firm — Cook Alex Ltd.

(57) ABSTRACT

A lockable container adapted to fit within a docking area in a vehicle comprising three side panels, a bottom panel, a top panel and fourth side panel comprising a lockable door arranged to define a cavity within which goods may be stored wherein at least one of the panels is constructed of a plastics material and is removable from the other panels. The container is light and may be repaired on-site and thereby remain durable and replacement of at least one side panel enables rapid repair of the container when damaged through collision with fixtures in the vicinity of use. The container may be used on a vehicle during a journey to dispense goods for example on an aircraft, bus or a train.

13 Claims, 3 Drawing Sheets

(51) Int. Cl.
    *E05B 39/04*     (2006.01)
    *B64D 11/00*     (2006.01)
    *B62B 5/00*     (2006.01)
    *B62B 3/00*     (2006.01)
    *A47B 47/00*     (2006.01)
    *A47B 69/00*     (2006.01)
    *E05B 41/00*     (2006.01)
    *E05B 47/00*     (2006.01)
    *E05B 65/00*     (2006.01)
    *E05C 21/00*     (2006.01)
    *G07C 11/00*     (2006.01)
    *A47B 47/05*     (2006.01)
    *A47B 31/00*     (2006.01)

(52) U.S. Cl.
    CPC .............. *A47B 69/00* (2013.01); *B62B 3/003* (2013.01); *B62B 3/004* (2013.01); *B62B 5/00* (2013.01); *B64D 11/0007* (2013.01); *E05B 39/04* (2013.01); *E05B 41/00* (2013.01); *E05B 47/00* (2013.01); *E05B 65/00* (2013.01); *E05C 21/00* (2013.01); *G07C 11/00* (2013.01); *A47B 47/05* (2013.01); *A47B 2031/002* (2013.01); *B62B 2202/67* (2013.01); *E05B 2047/0048* (2013.01); *Y02T 50/46* (2013.01)

(56) References Cited

U.S. PATENT DOCUMENTS

| | | | | |
|---|---|---|---|---|
| 5,056,194 A | * | 10/1991 | Huber | A47B 31/00 16/366 |
| 5,069,466 A | * | 12/1991 | Propst | A47B 31/00 211/186 |
| 5,465,660 A | * | 11/1995 | Conti | B30B 9/3003 100/100 |
| 6,244,458 B1 | * | 6/2001 | Frysinger | B65D 81/3823 220/592.09 |
| 2005/0077805 A1 | | 4/2005 | Dalebout et al. | |
| 2005/0212241 A1 | | 9/2005 | Stone | |
| 2006/0055290 A1 | * | 3/2006 | Schalla | A47B 31/06 312/223.1 |
| 2006/0070814 A1 | * | 4/2006 | Hu | B62B 5/00 186/45 |
| 2010/0140890 A1 | * | 6/2010 | Boivin | B62B 3/004 280/47.34 |
| 2011/0248458 A1 | * | 10/2011 | Belanger | B29C 65/483 280/47.35 |
| 2015/0091421 A1 | * | 4/2015 | Van Loon | B64D 11/04 312/249.8 |

FOREIGN PATENT DOCUMENTS

| | | |
|---|---|---|
| FR | 2228353 | 11/1974 |
| JP | S59 115932 U | 8/1984 |
| WO | WO 00/21410 | 4/2000 |
| WO | WO 2008/061541 A1 | 5/2008 |
| WO | WO 2008/065416 A1 | 6/2008 |

OTHER PUBLICATIONS

International Preliminary Report on Patentability for International Application No. PCT/EP2014/073715 dated Feb. 10, 2016.
United Kingdom Search Report for Great Britain Application No. GB 1319448.5 dated Apr. 24, 2014.

* cited by examiner

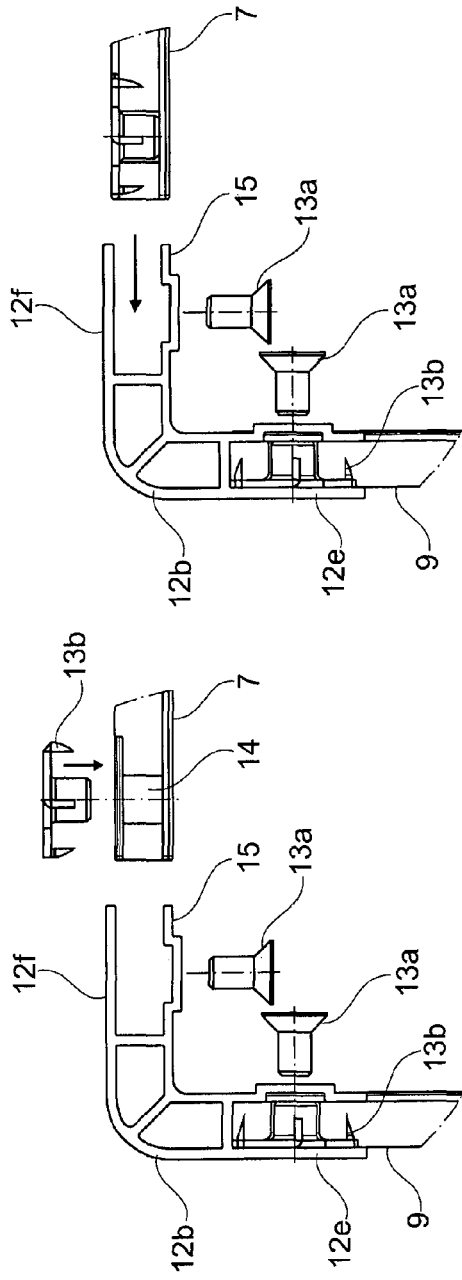
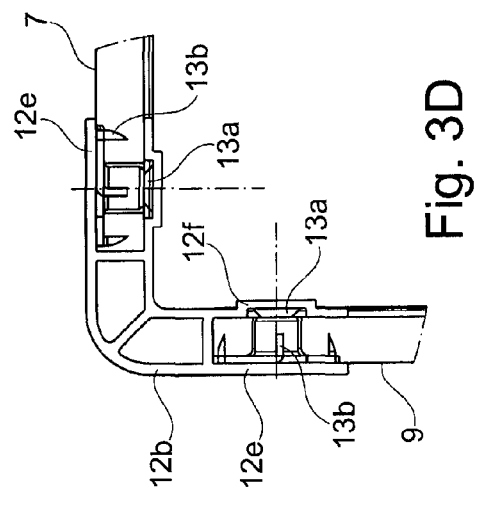
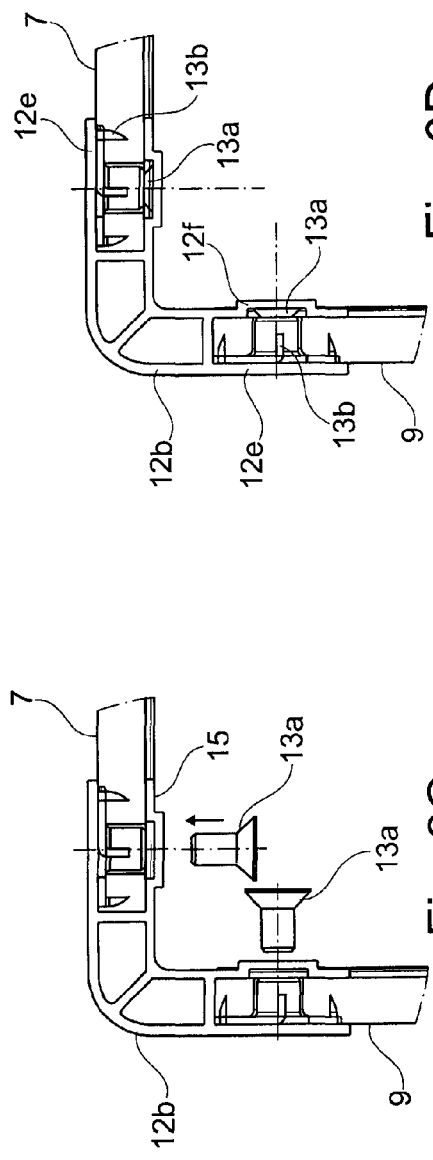

PORTABLE CONTAINER SYSTEM

CROSS-REFERENCE TO RELATED APPLICATIONS

This is a U.S. national stage application of International Patent Application No. PCT/EP2014/073715, filed Nov. 4, 2014, which claims the benefit of and priority to Great Britain Patent Application Serial No. GB1319448.5, filed Nov. 4, 2013, both of which are incorporated herein by reference.

The present invention relates to improvements in or relating to mobile or portable container systems that are used in transportation vehicles for transporting and delivery of materials such as food and drink trolleys, containers for merchandise and other goods. These systems are widely used in a transport context, for example on aircraft and trains. The invention is particularly concerned with such systems when used for delivery of food and drink and merchandise in aircraft.

Container systems for use on journeys in for example aircraft and trains have been in widespread use for many years. The container is usually loaded with the desired contents at a location remote from the point of delivery of the contents and are transported whilst loaded to the point of delivery of the contents. Once the journey has been completed the container is usually moved to another location for cleaning, and/or replenishment and/or to wait until it is next required. Large numbers of containers are typically required for any given vehicle in order to ensure that there are sufficient containers available for scheduled journeys and to allow replenishment, transit and cleaning as well as in-journey use. For example as many as 120 containers may be required for one journey of a Boeing 747 and 3 sets of containers are generally required for operational purposes, one set for in-flight use; one in transit and one in replenishment. It is estimated that over six million of these containers are in service worldwide.

The aviation industry has for many years sought to reduce the weight of aircraft in order to save on operational costs, particularly fuel costs, including fuelling aircraft with just sufficient fuel to complete a journey so as to avoid carrying excess fuel. Savings in weight allow cost savings or provide capacity to increase passenger numbers and increase revenue per flight. Reduction in the weight of components and accessories employed in the aircraft has been a long-standing objective in the design of aircraft components and accessories including in-flight containers, often referred to as "carts" or "galley carts".

The design of such containers has not altered substantially for many years, perhaps 30 years or more. The container must combine compactness, with structural rigidity and strength and the container must meet certain requirements as regards shape and dimensions in order to be stowed in a docking area during transit while not being used to deliver goods. Floor standing containers or carts must also be manoeuvrable due to often extremely tight tolerances on clearances and limited space for manoeuvre in the vehicle. In addition, in the airline industry, there are also stringent certification requirements relating to the airworthiness of the cart. Generally, all floor-standing carts in commercial use are manufactured and built as a fixed container with casters and a simple breaking mechanism. Such carts are secured by a variety of different locking mechanisms typically operated by a manual lever which may be locked with a padlock and a variety of different disposable seals mainly of plastic manufacture. The traditional unladen single cart weighs in the region of 15 kg.

Attempts have been made by cart manufacturers to lighten the weight of the cart by using lighter components. However, in employing lighter materials, whilst certification requirements have been met, the life expectancy and operational strength and rigidity of lightweight carts has been significantly compromised as compared to conventional carts. Whilst the lightweight carts are lighter than conventional carts, they are generally of the same design and construction with the weight being reduced by employing lighter duty parts. Typically a lightweight cart has a weight of around 10 kg.

During use, the containers are typically subjected to intensive, heavy handling in an environment where collisions with solid structures occur in the normal course of use or replenishment. The container may then be damaged as a consequence and its utility may be compromised or the container rendered unusable or unsafe. This creates a need for regular maintenance of such containers and for the provision of a maintenance schedule in relation to the containers thereby removing the container from service and increasing operational costs in order to ensure compliance with safety requirements and to maintain an effective operational capability. These requirements are costly both as regards "downtime" for a cart while it is being maintained and also in capital costs due to the need to have a larger number of carts to maintain a given level of operational capability while a proportion of the carts are undergoing maintenance.

This problem of damage during use is particularly problematic in using a lightweight container with a lower durability than standard containers.

US2010/0140890 describes a modular utility cart adapted to perform a range of tasks by changing a limited number of parts to enable a different function to be carried out. The cart may be adapted to provide a variety of utility modules, for example a top face or cover element module may be permanently or releasably secured to a body part to tailor the use of the cart while keeping the remainder of the cart substantially unchanged.

There remains a need to provide providing a container having certain dimensions or shape for use as an in-journey container for carrying goods and being suitable for stowing in existing docking areas, being durable and robust and complying with regulations, for example flammability and airline regulations whilst also being light and in reducing downtime associated with taking a container out of service in order to repair it. The vertical side panels and edges of containers are especially susceptible to damage.

We have now found that these objectives may be met by providing a container having a different design to the conventional design employed for many years wherein at least one of the panels is releasably securable to its adjacent panels and constructed of a plastics material. The container therefore comprises modular components and is lightweight.

In a first aspect the invention provides a lockable container adapted to fit within a docking area in a vehicle comprising three side panels, a bottom panel, a top panel and fourth side panel comprising a lockable door, wherein at least one of the panels is constructed of a plastics material and is removable from the other panels.

The four side panels, top panel and bottom panel define a cavity within which goods may be stored. The cavity is suitably equipped with internal structures adapted to accommodate goods to be delivered and dispensed from the container, for example drawers.

The removable panel is suitably releasably securable such that it may be removed and either repaired or replaced with a new panel which is then secured in place on the refurbished container. The removable panel may be secured to adjacent panels but preferably is secured to a frame, especially a lightweight frame made of polymer or metal, for example aluminium. Advantageously, by securing a panel to a frame, the container has a desirable combination of low weight, physical integrity, durability, interchangeability of panels to ensure efficient maintenance by minimising the maintenance period.

The removable panel suitably comprises engagement means for engagement with the frame, preferably complementary inter-engagement means, which allow removal and replacement of the panel. The engagement means are preferably manually operable. In a preferred embodiment the engagement means comprise quick-release studs which are manually operable with tools, for example a torx head screw driver, or without tools.

Suitably, each edge or an area near to each edge of the releasably securable panel may be secured to the frame or, in a different construction, to its respective adjacent panels. Suitably each edge is securable at two or more points separated along the edge and suitably being located towards each end of the edge.

By providing engagement means on the releasably securable panel, the container may be repaired during use or at least does not need to be sent to a repair area distant from its location of use and this significantly reduces the time in which the container is out of service, whilst ensuring the container remains durable through rapid replacement of damaged parts whilst employing lightweight materials of construction.

It is especially preferred that the engagement means are not accessible, and ideally not visible, from the outside of the container. The engagement means suitably are located such that they are accessible only from within the cavity defined by the container. Where present, the internal structure adapted to carry goods is removable to enable easy access to the engagement means.

The four side panels are suitably vertical. The bottom and top panels are suitably horizontal. The panels are preferably mountable on a frame of generally cuboidal configuration. Where the container is floor-standing, the container suitably comprises transport means, for example casters on the outside of the bottom panel.

Preferably the container fits snugly within the docking area and the container is dimensioned such that its length and width are at least 80% and desirably at least 90% of the length and width of the docking area. In a preferred embodiment the container has a width of 285 to 325 mm, for example 305 mm, a height of 1000 to 1040 mm, for example 1029 mm and a depth of 385 to 425 mm, for example 405 mm.

Containers are particularly susceptible to damage on their side panels or edges between adjoining side panels during use through collision with fixtures and fittings in the environment in which the container is used, especially where space is limited, for example in aircraft. In a preferred embodiment, the invention provides a container in which at least one of the side panels and preferably two or three of the side panels are releasably securable to the frame of the container or to adjacent panels. Two or more of the panels, and preferably all of the panels, are releasably securable to the container enabling removal of a panel and replacement with another panel.

In a preferred embodiment, the container comprises an internal temperature control system to regulate the temperature of the contents of the container. Suitably, this system comprises heating temperature changing means, for example heating means and/or cooling means, which desirably is controllable by an electronic control unit. The temperature control system provides a high degree of thermal regulation or protection for hot and/or cold products stored in the container. If desired, the container may comprise separate internal areas in which the temperature may be independently controlled.

In a preferred embodiment, the invention provides a lockable container adapted to fit snugly within a docking area in a vehicle comprising three side panels, a bottom panel, a top panel and fourth side panel comprising a lockable door, wherein all of the panels are constructed of a plastics material and each panel is releasably securable to a frame or to its adjacent panels, each panel comprising engagement means to allow it to be secured to the frame or to each of the adjacent panels.

Suitably, the container door comprises a latch for ease of closing the lockable door during operation. Preferably, latch comprises a mechanism comprising a latch which locks the door of the container upon being closed or slammed. Desirably the latch engages about a single point on the container. In a preferred embodiment, the latch is manually openable using one hand. In a preferred embodiment, the door incorporates a separate spring loaded slam locking latch system which allows operators to open the door on the latch but simply secure the door by pushing it closed without using the latch lever. The door may be held closed by a catch, for example a magnetic catch instead of or in addition to a latch when the door is closed but unlocked.

The container is suitably provided with a security system which comprises a locking mechanism, preferably a four point dead-locking system, preferably comprising three vertical locks from the door into the door frame on the container and a fourth lock into the door from the container. The locking mechanism is suitably controllable by the security system for example by an electronic control panel configured to provide a signal to lock or unlock the lock thereby providing protection against theft. Preferably, the security system comprises a user interface, for example a management control panel which is integral with the container and suitably contained within one of the panels, preferably the door, and produces a seal number upon locking the container as required by customs and provides seal numbers which are "clone-proof", in other words, the seal number is generated by a microprocessor but the microprocessor generates a different number in successive operations. The seal number may be generated using a random number generator provided that, the seal number is not repeated in successive operations.

The user interface suitably comprises an electronic touch key, lock for user or staff identification. Suitably, the lock may provide a large number of unique identifiers which may be paired with an individual user or member of staff such that upon an "event" occurring, an "event" being opening or closing the container or stowing or removing the container, information relating to the identity of the person is recorded thereby providing a full audit trail facility.

In a preferred embodiment, the security system records information to identify the container, the user of the key, the seal number, the time at which the door is unlocked, opened, closed, locked and the internal temperature of the container. Preferably, the electronic key allows the system to be unlocked or re-set but once unlocked the door can be opened and closed at will although every event will be recorded. The user interface suitably comprises coloured touch pads to control operational applications and at various stages during the operation of the security system, the user interface displays messages, information or instructions and the like for example to provide guidance to the user.

The security system preferably comprises a tamper evident lock and a seal system so that evidence of tampering is provided and may be recordable as an "event". A suitable tamper evident lock is described in WO2008/061541. Preferably the locking or sealing system comprises a lock housing adapted to be fitted to the container and comprising a locking mechanism for locking and unlocking the container; a device within the lock housing for generating an output upon locking and/or unlocking the locking mechanism; recording means for recording the output and optionally recording information relating to the time of the generation of the output; means for detecting or displaying the output externally of the lock housing whereby the output is recordable remotely of the locking apparatus. A device may be provided within the lock housing for generating an identifier for the container and for generating an output upon locking and/or unlocking the locking mechanism; recording means for recording the output and optionally recording information relating to the time of the generation of the output; means for detecting or displaying the output externally of the lock housing whereby the output is recordable remotely of the locking apparatus.

The lock suitably comprises electronic and or magnetic sensors which provide an indication of attack by electronic or magnetic means which, desirably is recorded to provide evidence of tampering. Preferably the components of the locking apparatus are operably connected using means which are not susceptible to electronic attack, for example by magnetic switches. Suitably the apparatus comprises sensor magnets which upon detection of an external magnet trigger generation of a new output code and recordal of that fact and information relating to the time of generation of the new code thereby alerting the user to the possibility of an attempt at unauthorised access through magnetic attack.

The identifier as well as providing a unique individual identifier for the container in connection with which it is used may optionally provide additional information for example the identity of the owner of the container, the type of container and the type of journey with which it is used, for example rail or aircraft journeys. The container may be identified at any location and at any stage in the life cycle of a container, information relating to a particular journey from storage through loading to delivery to the vehicle, use during the journey, removal from the vehicle, and delivery to cleaning and/or storage and/or replenishment for a subsequent journey may be provided.

The identifier and any additional information is suitably transmitted to a database where it is stored to enable central management of a fleet of containers. The central database can be owned by one owner of the container or it can be a database storing information concerning containers owned by a plurality of owners in which access to information by each participant is limited to information concerning their own containers.

By downloading the information retrieved from the container it is possible to add information to the information that has been retrieved. For example, information relating to damage to the container and is in need of repair may be provided and replacement panel(s) may then be dispatched to an appropriate location of the container for on-site repair. In a further embodiment the use of the central database can provide reminders of when regular maintenance and servicing of a container may be required.

Preferably, recorded data is downloaded via an electronic data reader, ideally by way of a touch pad situated on the user interface. This data may be recalled in reports ordered by the container identification reference, date or flight number and optionally, location, damage to the container and details of missing stock In a further aspect the invention provides an event recording system for a container according to this invention comprising a remote system communicable with the security system of the container, the security system preferably comprising communication means to provide a data-transfer link to the remote system such that all information relating to each event is recorded for example the nature of the event, the time and location of the event and the identity of the person responsible for the event or, if not a recognised identity, an indication to that effect, the remote system comprising a database of historical events relating to the container and optionally being able to produce reports of the events as desired.

The event recording system suitably is communicable with a plurality, preferably hundreds or thousands of containers in service to provide a transport company, for example an airline or train operating company, with a full audit mechanism for each of it containers in use.

The container of the present invention may comprise a single or double door construction in which two opposing side panels each comprise a door.

Suitably, the four side panels, the top panel and the bottom panel are constructed of a plastics material, preferably a fire-resistant plastics material. The panels are suitably produced by injection moulding. The panels suitably are releasably mountable on a frame. The frame may be a single part or, preferably comprises a plurality of generally linear parts which are connectable together to form the frame.

In a preferred construction, the container comprises an injection moulded plastic base to which four rolling elements, preferably casters, are fitted with an integral breaking system to prevent movement when applied. The braking system suitably comprises two colour coded foot pedals to apply or release the breaks. Suitably, the container comprises a frame constructed of a polymer or a metal, preferably aluminium. Preferably, the side panels comprise high stress thermoplastic components which are secured to the frame, preferably an extruded aluminium frame, by quick release "toggles" from the inside of the cart. Suitably, the side walls have internal drawer slides incorporated as part of the moulding to enable accommodation of internal structures, for example drawers.

Preferably, the top is of similar construction to the base but comprises handles for manoeuvring the container.

Suitably, the doors have the same or similar construction to the side panels but preferably comprise an internal four point dead locking bolt mechanism secured and locked by a battery powered motor that prevents the movement of the bolt and thus unlocking when set in the locked position.

In a further aspect the invention provides a kit for assembling a lockable container adapted to fit within a docking area in a vehicle, the kit comprising three side panels, a bottom panel, a top panel and a fourth side panel comprising a lockable door, wherein each panel is generally planar and comprises engagement means to enable assembly with the other panels directly or by mounting on a frame to form the container panel.

Suitably, the container is fully modular and may be supplied as a flat-pack kit, thereby providing for efficient supply and optimisation of freight space. The frame preferably comprises a plurality of generally linear parts which are connectable together to form the frame and may be packed in a flat manner, coplanar with the panels. A large quantity of containers may be supplied in the same volume as a far smaller number of conventional carts and assembled after delivery at the customers site.

Preferably, components which are not planar with the panels, for example casters, and the like are provided detached from the panels and may be assembled upon assembly of the container. The door locking bolt is suitably contained within or on the door panel.

The container of the present invention may be used where the container needs to be mobile during the journey and is not an integral part of the vehicle performing the journey, such as an aircraft, bus or a train. Examples of containers to which the present invention applies are wheeled containers such as trolleys that are used to contain food and drinks for passengers or merchandise that is to be sold such as duty free materials such as alcohol, tobacco, perfumes, gifts, jewelry and the like. The invention is also applicable to canisters which may not have wheels and can be used for the storage of merchandise. The term container is used herein to include containers, canisters and any other body for carrying goods for dispensing during a journey.

The present invention is illustrated by reference to the accompanying drawings in which:

FIG. 3 shows four drawings, FIGS. 3A to 3D, showing a horizontal cross section of a part of the container at a vertical edge where the frame and a panel are interconnected and which show the construction and sequences of assembly of the panels and frame of the container;

Figure 1:
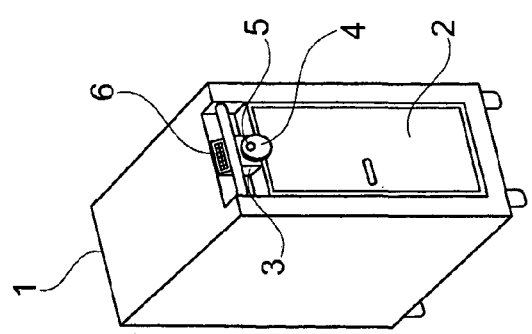
FIG. 1 shows a perspective view of container according to the invention.

FIG. 1 shows a container according to the invention, being an airline service trolley 1 with a front panel comprising a door 2 and a locking apparatus 3 fitted to the trolley 1 with a locking latch 4 operated by the locking mechanism 5 in the locked position and separate side panels, top panel, bottom panel and door panel which are connectable to form the container 1 and wherein any one or more of the panels may be replaced whilst leaving container otherwise in its assembled form. When unlocked the locking latch 4 rotates by 180 degrees about an axis through the locking mechanism 5. A pseudo random security code is displayed in window 6. The code may be generated upon unlocking the container and then become active upon subsequent locking of the container. Upon locking the mechanism 5, a device within the lock housing for generating an output upon locking the locking mechanism 5 may generate and display a new pseudo-random security code depending on how the user wishes to configure the locking apparatus 3. The code will be recorded by the recording means within the lock housing and optionally together with information relating to the time of the generation of the output.

Figure 2:
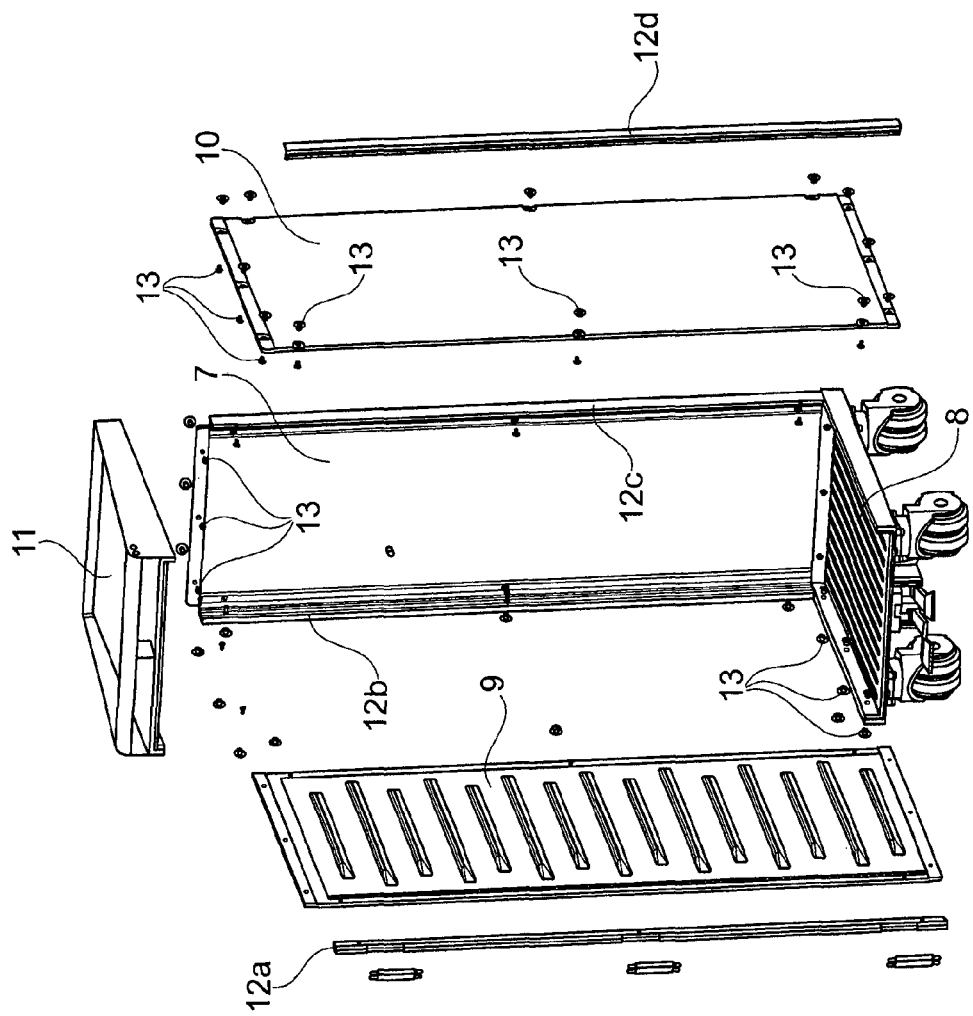
FIG. 2 shows an exploded perspective view of a container according to the invention.

FIG. 2 shows an exploded perspective view of a container according to the invention with one of the side panels 7 and the base panel 8 mounted on a frame and the two other side panels 9, 10 and top panel 11 and parts of the collapsible frame also shown. The frame comprises four vertical parts 12a, 12b, 12c, 12d which are connectable to the base panel 8 using studs 13 (only some of these are marked in the drawing for clarity). The studs 13 are spaced along the edge of the panels, three per edge, to provide secure fixing of the panel to the frame. The studs 13 are located such that they may be dismantled only from within the container. The door panel is omitted for clarity. The base panel 8 has casters 14 affixed to it.

FIG. 3 shows four drawings, FIGS. 3A to 3D respectively which illustrate the construction and sequences of assembly of the panels and frame of the container. FIGS. 3A to 3D show a horizontal cross section of a part of the container at a vertical edge where the frame and a panel are interconnected. The studs 13 comprise complementary inter-engaging parts 13a and 13b which act to secure the panels 7, 8, 9, 10, 11 and the door panel (not shown) to the frame 12. The frame 12b has parts 12e and 12f which define slots along the length of the frame 12b and are adapted to receive panels 7 and 9 which are then releasably secured in the frame 12b using the studs 13a which engage with parts 13b.

The same mechanism is employed at each of frame parts 12a to 12d to secure the side panels 7, 9, 10 and the door panel. The side panels and door panel may be secured to the base panel 8 and the top panel 11 directly as shown or may be secured to a frame having horizontal parts between the vertical panels and the horizontal panels in a similar arrangement as shown for connecting adjacent side panels. FIG. 3A shows panel 9 engaged with the slot 12e and panel 7 not so engaged. Part 13b, which is adapted to receive part 13a, is inserted into an aperture 1 in panel 7 and lies flush with the outside surface of panel 7. Panel 7 is inserted into slot 12f as shown in FIG. 3B. Once located in slot 12f as shown in FIG. 3C, part 13b is not visible from the outside face of panel 7, it being located within the slot 13f. Part 13a is then inserted into the other side of aperture 14 via access orifice 15 in the frame 12b on the inner side of slot 12f whereupon part 13a and part 13b interengage to releasably secure the panel 7 to frame 12b as shown in FIG. 3D. Of the stud 13, only part 13a is visible and this is visible only from within the cavity of the container once the container has been assembled.

Figure 4:
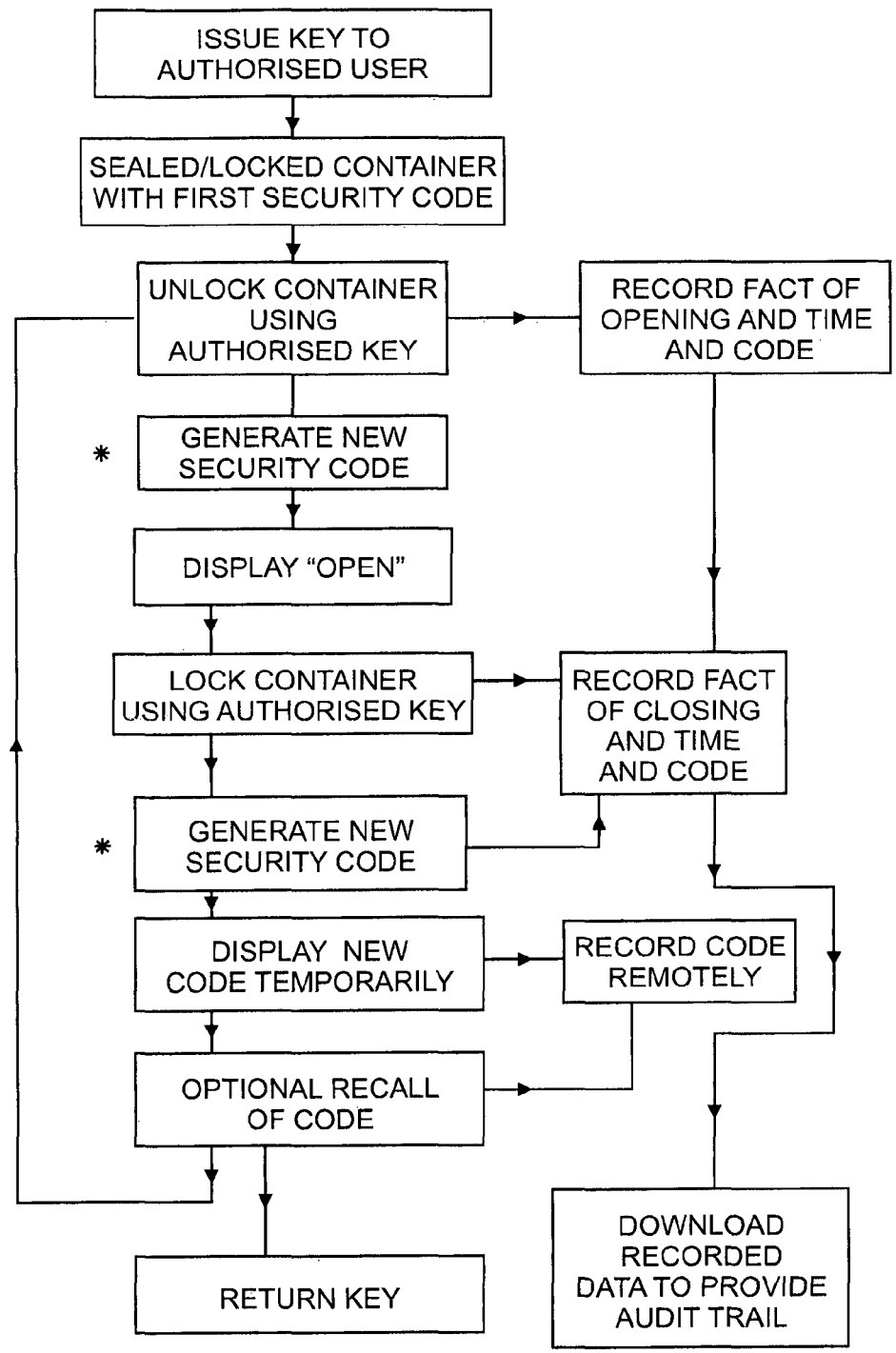
FIG. 4 shows a flow diagram setting out the steps of an illustrative method of operating the container of the invention.

FIG. 4 shows a flow diagram setting out the steps of an illustrative method of the invention involving issuing a key to a use where the key is identified with the user. The container is locked or sealed and a security code is associated with the container and which optionally may be recalled by the user. Upon unlocking the container with the authorised key, recording means records the fact that the lock has been unlocked, the date and time and optionally the security code pertaining at that time. Suitably, a new seal number is generated when the container is unlocked. Preferably, this number becomes active once the door is then locked as the seal number may need to be recorded prior to the door being locked. For example generation of the seal number upon unlocking the container allows recordal of the seal number using a point of seal machine to generate a new manifest which may then be locked in the container which is then locked. The display displays "OPEN" to the user indicating the status of the container. Upon locking the container, the device for generating an output generates a new security code and this is suitably recorded together with information relating to the time and date of the locking process. This code is then displayed temporarily whereby the user may record the code remotely, for example in completing a cargo manifest. The code is not generated or displayed until the container has been locked. As required, the user may temporarily recall the code to the display for later remote recordal. The unlocking and locking procedure may be repeated as often as required until such time that responsibility for the container is transferred. At that time, the key is suitably returned to safe storage and responsibility for the container discharged. At that time or subsequently, the recorded information relating to the locking and unlocking procedures, the time and date and the code for each procedure may then be transferred remotely so providing an audit trail for the container while in the care of the user.

The invention claimed is:

1. A lockable container adapted to fit within a docking area in a vehicle, the lockable container comprising three side panels, a bottom panel, a top panel and fourth side panel comprising a lockable door arranged to define a cavity within which goods may be stored wherein at least one of the side panels comprises a lightweight material and further comprises manually operable engagement means and is a releasably securable modular panel adapted to be manually removed from the container without dismantling the container whereby a damaged side panel is removable for repair or replacement during use, wherein the container comprises a security system which comprises a user interface and a locking mechanism controllable by the user interface and produces a seal number upon locking the container, wherein the security system records information to identify the container, the user of the key, the seal number, the time at which the door is unlocked, opened, closed, locked and the internal temperature of the container.

2. The lockable container according to claim 1 wherein the container further comprises a frame to which the at least one removable side panel is releasably secured.

3. The lockable container according to claim 2 wherein at least two of the panels are releasably securable to the frame.

4. The lockable container according to claim 1 wherein the engagement means comprises manually operable quick-release studs.

5. The lockable container according to claim 4 wherein the engagement means are not accessible from the outside of the container.

6. The lockable container according to claim 1 wherein the panels are mounted on a frame of generally cuboidal configuration and the container comprises transport means on the outside of the bottom panel.

7. The lockable container according to claim 1 wherein the container fits snugly within a docking area and the container is dimensioned such that its length and width are at least 80% of the length and width of the docking area.

8. The lockable container according to claim 1 wherein the container comprises an internal temperature control system.

9. The lockable container according to claim 1 wherein the container door comprises a latch and a spring adapted to allow an operator to open the door on the latch and secure the door by pushing it closed without using the latch.

10. The lockable container according to claim 1 wherein the data recorded by the security system is transmissible via an electronic data reader to a remote database.

11. The lockable container according to claim 1 wherein the lock comprises a tamper evident lock.

12. A kit for assembling a lockable container as defined in claim 1 adapted to fit within a docking area in a vehicle, the kit comprising three side panels, a bottom panel, a top panel and a fourth side panel comprising a lockable door, wherein each panel is constructed of a lightweight material, is generally planar and comprises engagement means to enable assembly with the other panels to form the container by engagement with complementary engagement means on a frame or on each adjacent panel.

13. A kit for assembling a lockable container as defined in claim 1 wherein each panel may be assembled with the other panels directly or by mounting on a frame to form the container.

* * * * *